United States Patent [19]
Kelley et al.

[11] Patent Number: 6,061,669
[45] Date of Patent: May 9, 2000

[54] NOTIFICATION SYSTEM FOR ACCESS TO AND PRINTING OF PROPRIETARY NETWORK SERVICES

[75] Inventors: Edward E. Kelley, Wappingers Falls; Christopher E. Cartier, Stony Point; Norman J. Dauerer; John U. Knickerbocker, both of Hopewell Junction, all of N.Y.

[73] Assignee: International Business Machines Corporation, Armonk, N.Y.

[21] Appl. No.: 08/978,918

[22] Filed: Nov. 26, 1997

[51] Int. Cl.[7] ........................................ G06F 7/00
[52] U.S. Cl. ............................................... 705/400
[58] Field of Search ................... 705/400, 418; 380/4, 24, 25, 23

[56] References Cited

U.S. PATENT DOCUMENTS

| | | | |
|---|---|---|---|
| 4,623,965 | 11/1986 | Wing ............................................ | 705/8 |
| 4,763,356 | 8/1988 | Day, Jr. et al. .......................... | 379/368 |
| 4,787,045 | 11/1988 | Storace et al. ........................... | 705/404 |
| 5,530,759 | 6/1996 | Braudaway et al. ....................... | 380/54 |
| 5,647,056 | 7/1997 | Barrett et al. ............................ | 709/220 |
| 5,915,019 | 6/1999 | Ginter et al. ................................. | 380/4 |

OTHER PUBLICATIONS

IBM Technical Disclosure Bulletin, *Temporary Global Passwords*, vol. 36, No. 03, Mar., 1993; pps 451–453.

Canon Internet Web Page, www.ccsi.canon.com/webrecord/, Apr. 24, 1997.

IBM Technical Disclosure Bulletin, *Resource Access Control Facility Password Propagation for Multiple Virtual Storage*, vol. 36, No. 06B, Jun. 1993.

IBM Technical Disclosure Bulletin, *Network Signon Coordination Configuration*, vol. 36, No. 12, Dec. 1993.

*Primary Examiner*—Emanuel Todd Voeltz
*Assistant Examiner*—Thomas A. Dixon
*Attorney, Agent, or Firm*—DeLio & Peterson LLC; Peter W. Peterson; Aziz M. Ahsan

[57] ABSTRACT

A method and system to have network web servers that provide services to pass on the unit costs for each of the services and to have the web client computer track the usage of each service, maintain an up to date summary of each service from each provider and to periodically summarize all of the charges. The computed charge are reconciled with the bills from the providers of service, then the payments are sent after reconciliation. Any discrepancy between computed charges and billed charges may be paid at the computed totals with an explanation attached.

32 Claims, 5 Drawing Sheets

NOTIFICATION SYSTEM FOR ACCESS TO AND PRINTING OF PROPRIETARY NETWORK SERVICES

BACKGROUND OF THE INVENTION

1. Field of the Invention

The present invention relates to computer programming and, in particular, to computer software usable on a web client computer for tracking and reconciling costs of accessing and printing information from a web network computer.

2. Description of Related Art

Computer services on the web (Internet) often charge a fee for units of connect time, such as logging on to web network computers, or for printing propriety pages. These fees are tracked by the network service providers, who then periodically send bills to the user for the time or printing fees expended on the web client computer. When the web client computer uses multiple network services, there is also a need to collect records of these charges from all of the network providers and to maintain a running total of the charges.

It would be useful to have the web client computer keep track of the time and costs independent of the tracking done by the providers of services. There is presently nowhere available the means to have a periodic accumulation of surcharges for web related services that can be printed, viewed and automatically stored in a file to show past and present billings. Since there may be errors or discrepancies in the providers' bills, there is a need to reconcile the charges from each provider of service, and then send the electronic payment after reconciliation.

Bearing in mind the problems and deficiencies of the prior art, it is therefore an object of the present invention to provide a web client computer and software which can keep track of the time and costs of accessing computer services on the web or a network independent of the tracking done by the providers of services.

It is another object of the present invention to provide such a computer and computer program which collects these charges from all of the providers and maintains a running total of the charges at the web client computer.

A further object of the invention is to provide such a computer and computer program which periodically accumulates surcharges for web related services that can be printed, viewed and automatically stored in a file to show past and present billings.

It is yet another object of the present invention to provide such a computer and computer program which reconciles the charges from each provider of service, and then automatically send the electronic payment after reconciliation.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for determining access charges to a web client computer for computer services from a web network computer comprising the steps of:

a) providing a data base at the web client computer for unit time connection costs to a desired computer service accessible from a network;

b) connecting the web client computer to the web network computer service;

c) commencing timing of the connection to the computer service;

d) disconnecting the web client computer from the computer service;

e) determining at the web client computer the time connected to the computer service; and f) determining at the web client computer from the data base the total cost for the connection to the computer service.

The process may further include the step of determining if unit time connection costs for computer services have changed, and if the unit costs for computer services have changed, the step of updating the data base with the changed unit time connection costs for computer services. The web network computer may determine if unit time connection costs for computer services have changed, such that the web network computer sends to the web client computer the changed unit time connection costs for computer services to update the data base.

The process may also include the steps of determining at the web client computer if the web network computer has authorization to update the data base, and if the web network computer has authorization, permitting the web network computer to access the data base to change the unit time connection costs for computer services. Preferably, the web network computer maintains a first list of web client computers which permit access to update the web client computer data base and a second list of web client computers which deny access to update the web client computer data base. The list may be updated after sending to the web client computer the changed unit time connection costs for computer services. The web client computer may determine if the web network computer has authorization to update the data base, and if the web network computer does not have authorization, the web client computer may notify the web network computer that it does not have access to update the data base. The web network computer may then send notification to the web client computer that the web network computer was denied access to update the web client computer data base.

The process may further comprise the steps of:

i) determining at the web network computer total web client computer connection cost for the desired computer service;

ii) sending the total web client computer connection cost for the desired computer service from the web network computer to the web client computer; and iii) reconciling at the web client computer the total computer service connection cost determined by the web network computer with the total computer service connection cost determined by the web client computer.

The web client computer may authorize payment of the total computer service connection cost determined by the web network computer. The web client computer may determine any discrepancy in total service connection costs determined by the web network computer and the web client computer, and print a report of any such discrepancy.

The web client computer may maintain a data base containing individual total computer service connection costs determined by the web client computer. The web network computer sends to the web client computer individual computer service total connection costs determined by the web network computer. Reconciliation then comprises matching individual total service connection costs as determined by the web network computer and the web client computer to determine any discrepancy in total service connection costs, and printing a report of any such discrepancy.

The web client computer may authorize payment of the total computer service connection cost determined by the web network computer, and send with the payment a request for explanation regarding any such discrepancy.

In a related aspect, the present invention provides a system for determining access charges to a web client computer for computer services from a web network computer which includes a data base at the web client computer of unit time connection costs to a desired computer service accessible from a network. A means is provided for connecting the web client computer to the web network computer service and for determining at the web client computer the time connected to the computer service. There is also provided a means for determining at the web client computer from the data base the total cost for the connection to the computer service.

The system may further comprise means for determining at the web network computer total web client computer connection cost for the desired computer service; means for sending the total web client computer connection cost for the desired computer service from the web network computer to the web client computer; and means for reconciling at the web client computer the total computer service connection cost determined by the web network computer with the total computer service connection cost determined by the web client computer.

In another aspect, the present invention provides a process for determining printing charges to a web client computer for computer services from a web network computer comprising the steps of:

a) providing a data base at the web client computer for unit information printing costs from a desired computer service accessible from a network;

b) connecting the web client computer to the web network computer service;

c) commencing printing of information from the computer service;

d) determining from the web client computer data base the printing cost for the information from the computer service;

e) optionally commencing printing of further information from the computer service;

f) determining from the web client computer data base the printing cost for any further information from the computer service;

g) determining at the web client computer the total cost for printing information from the computer service; and h) disconnecting the web client computer from the computer service.

The process may further include the step of determining if unit information printing costs for computer services have changed, and if the unit costs for computer services have changed, the step of updating the data base with the changed unit information printing costs for computer services. The web network computer may determine if unit information printing costs for computer services have changed, such that the web network computer sends to the web client computer the changed unit information printing costs for computer services to update the data base.

The web client computer may determine if the web network computer has authorization to update the data base. If the web network computer has authorization, the web client computer permits the web network computer to access the data base to change the unit information printing costs for computer services.

The web network computer may maintain a first list of web client computers which permit access to update the web client computer data base and a second list of web client computers which deny access to update the web client computer data base. The web network computer may then update the list after sending to the web client computer the changed unit information printing costs for computer services. The process may also include the steps of determining at the web client computer if the web network computer has authorization to update the data base, and if the web network computer does not have authorization, notifying the web network computer that it does not have access to update the data base. The web network computer may then send notification to the web client computer that the web network computer was denied access to update the web client computer data base.

The process may further comprise the steps of:

i) determining at the web network computer total web client information printing cost for the desired computer service;

ii) sending the total web client information printing cost for the desired computer service from the web network computer to the web client computer;

iii) reconciling at the web client computer the total computer service information printing cost determined by the web network computer with the total computer service information printing cost determined by the web client computer.

The web client computer may then authorize payment of the total computer service information printing cost determined by the web network computer. The web client computer may determine any discrepancy in total service information printing costs determined by the web network computer and the web client computer, and print a report of any such discrepancy.

The web client computer may maintain a data base containing individual total computer service information printing costs determined by the web client computer; and the web network computer may send to the web client computer individual computer service total information printing costs determined by the web network computer. Reconciliation comprises matching individual total service information printing costs as determined by the web network computer and the web client computer to determine any discrepancy in total service information printing costs, and printing a report of any such discrepancy. The process may further include authorizing payment at the web client computer of the total computer service information printing cost determined by the web network computer, and sending with the payment a request for explanation regarding any such discrepancy.

In a related aspect, the present invention also provides a system for determining printing charges to a web client computer for computer services from a web network computer comprising a data base at the web client computer of unit information printing costs from a desired computer service accessible from a network; means for determining from the web client computer data base the printing cost for information printed from the computer service; and means for determining at the web client computer the total cost for printing information from the computer service.

The system may further comprise means for determining at the web network computer total web client information printing cost for the desired computer service; means for sending the total web client information printing cost for the desired computer service from the web network computer to the web client computer; and means for reconciling at the web client computer the total computer service information printing cost determined by the web network computer with the total computer service information printing cost determined by the web client computer.

In another related aspect, the present invention also provides a program storage device readable by a machine, tangibly embodying a program of instructions executable by the machine to perform the aforementioned processes.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–5 of the drawings in which like numerals refer to like features of the invention. Features of the invention are not necessarily shown to scale in the drawings.

The present invention provides a method and system to have the web servers that provide the services to pass on the unit costs for each of the services and to have the web client computer track the usage of each service, maintain an up to date summary of each service from each provider and to periodically summarize all of the charges. A further part of the method and system of the present invention is to reconcile the computed charge with the bills from the providers of service, then send the payments after reconciliation. Any discrepancy between computed charges and billed charges may be paid at the computed totals with an explanation attached.

Figure 1:
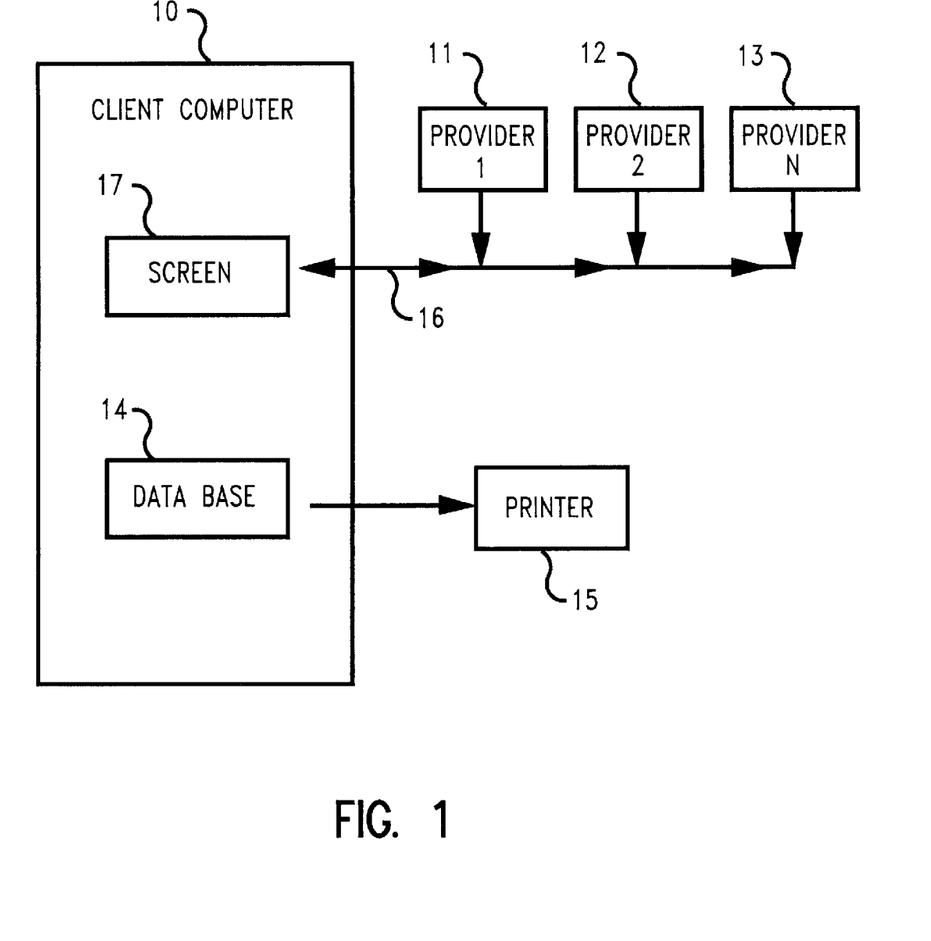
FIG. 1 is a schematic of the system of the present invention for determining access and printing charges to a web client computer for computer services from a web network computer.

A typical web client/network system is illustrated in FIG. 1. Web client computer 10 is linked by telephone or other network cable to a plurality of network service provider computer web servers 11, 12 and 13. Such providers may be on the Internet or on an intranet system. Web client computer 10 has a microprocessor for executing stored programs and includes a data base 14 on its program storage device for storage of network charges for access per unit time, printing and other fees charged by each network service provider. The computer program or software incorporating the process steps and instructions described further below may be stored on an otherwise conventional program storage device, such as a semiconductor chip, a read-only memory, or magnetic media such as a diskette or computer hard drive, which is readable and executable by a computer in conjunction with a web browser such as Netscape Navigator. A screen 17 is able to display the time and printing costs and other information calculated by the web client computer or available from the network. A printer 15 is connected to the web client computer for printing out the accessed information and other reports discussed in more detail below.

Definitions relevant to the present invention are as follows:

Unit Cost Notification Notification that a unit cost has changed and written to the customer's storage.

CCL (Customer Cost List) A list of each customer, the customer's electronic address and directory to update the unit costs and whether there has been a notification of each unit cost.

Unit cost The costs per unit of service from each provider for its services.

Notification list The list containing each customer to be notified, the customer's address and the unit costs for each customer service.

Validation failure list The list containing all of the customers that the web server was unable to notify.

HTML Hypertext Markup Language.

HTML source file File with the HTML tags to be converted by a web browser to be displayed on a monitor.

URL Uniform resource locator.

Connection service. An application that is provided to the web client computer workstation that allows the web client to logon or connect to another system to use a computer or computer application supplied by a provider of service.

Monitor list A list of services, unit cost of services, and the providers of service addresses.

Print service An application that is provided to the web client workstation computer that allows the web client to logon or connect to another system and use a computer or computer application supplied by a provider of service to print or view propriety material.

Print interim cost file The file listing the items printed, the cost, data and service provided.

Summarized cost file This file service provider, services, cost summary and the dates of service.

Connection timer A process timer that tracks the time that application is running or the time that a logon remains connected.

Figure 2:
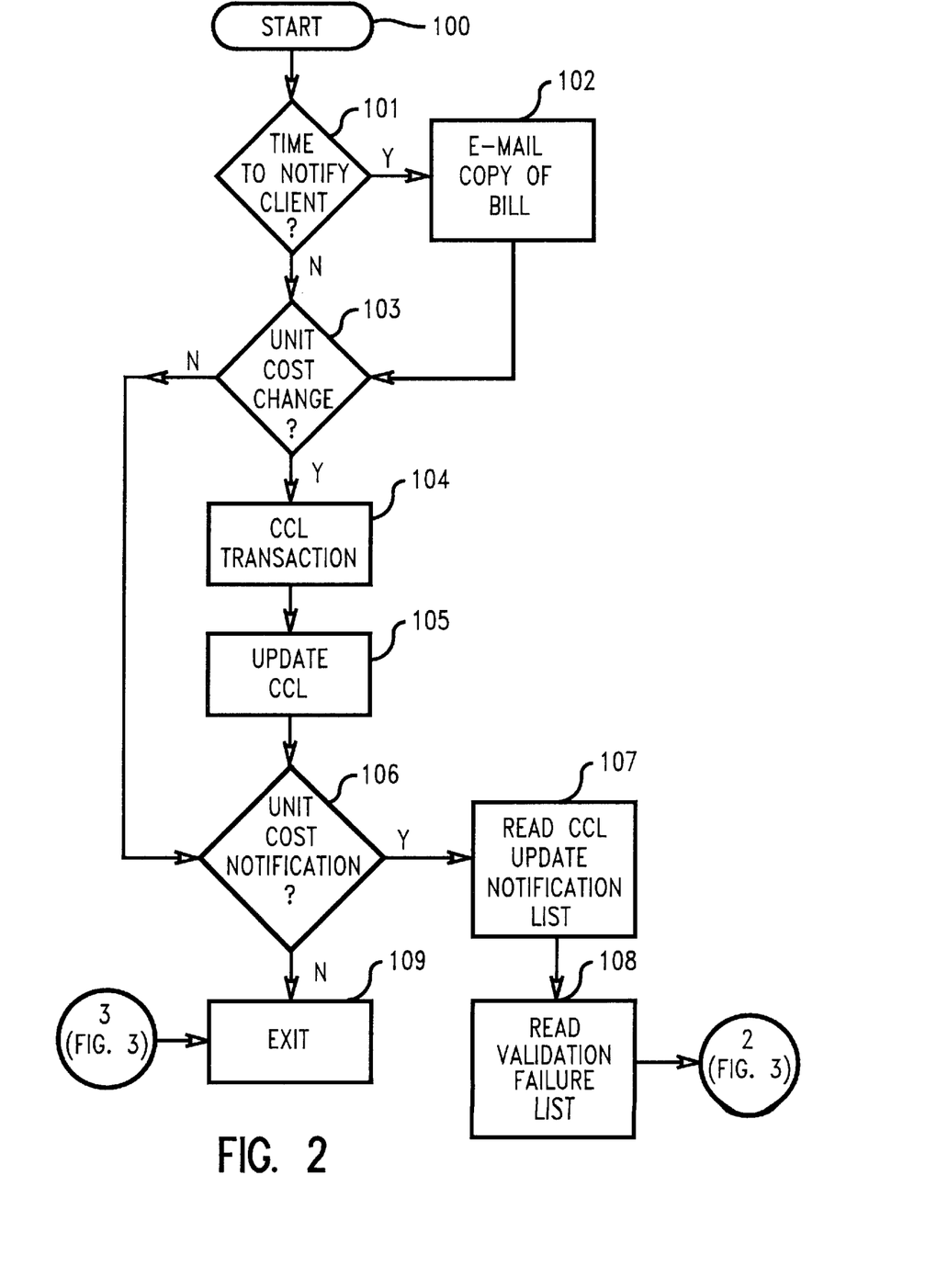
FIGS. 2–5 are block diagram flow charts of the preferred steps employed in practicing the present invention.
Figure 3:
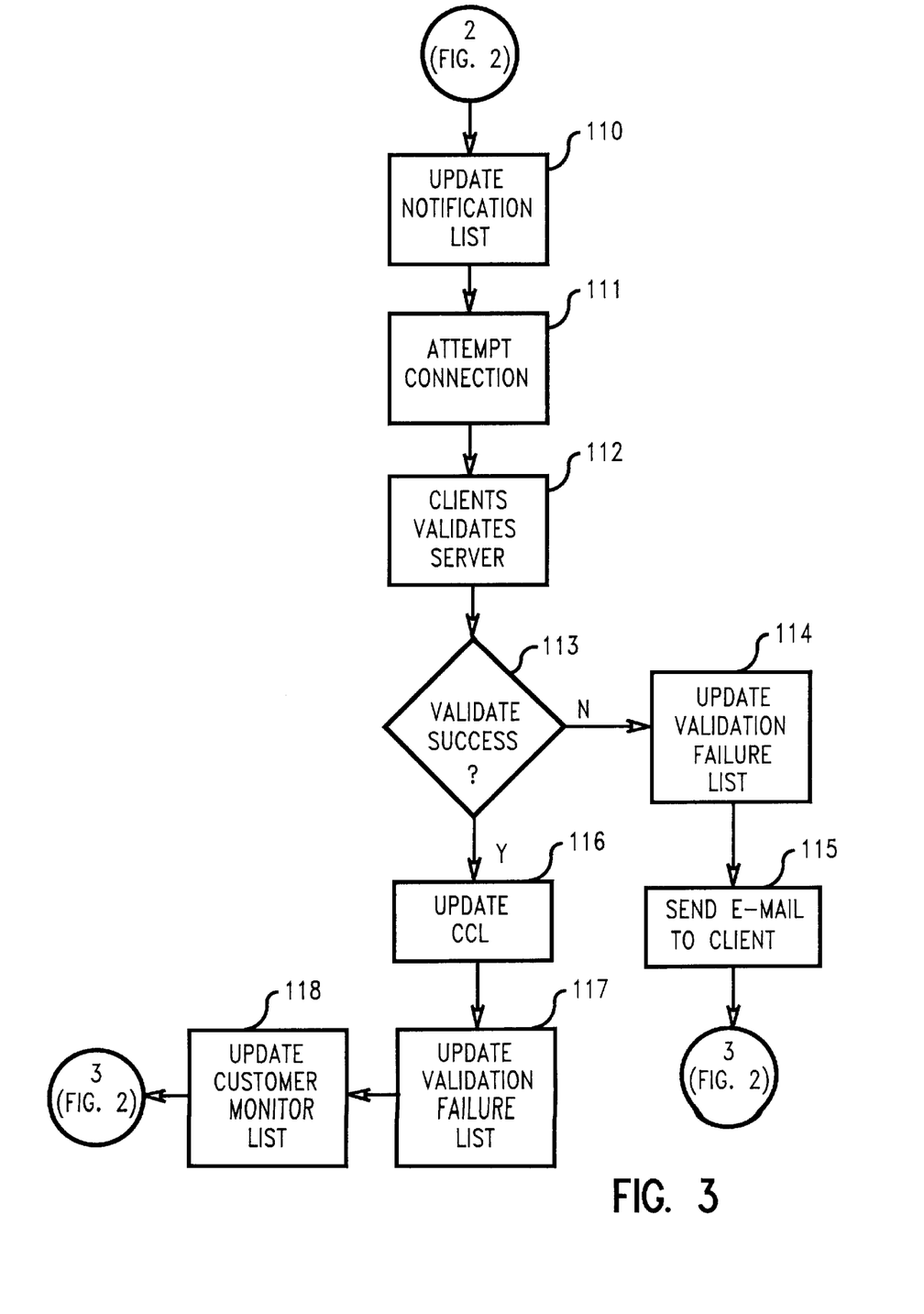

Flow charts of the process used in the present invention are shown in FIGS. 2–5. Numerals in circles indicate connection with like numerals in other parts of the flow charts. The flow chart description is as follows:

FIGS. 2 and 3 describe the operations on the network provider's computer web server.

100 Start the web server process.

101 Time to notify the web client? Is it time to notify the web client of the accrued charges for that web client by sending via e-mail a copy of the bill?

102 E-mail copy of bill. The web server will send the customer a copy of the bill at the web client workstation.

103 Unit cost change? Has the unit costs for a service changed?

104 CCL transaction. Prepare a CCL transaction to update the customer cost list.

105 Update CCL. Update the customer cost list with the unit costs that have changed.

106 Unit cost notification Is it time to issue a unit cost notification to the customer's storage?

107 Read CCL update notification list. Read the customer cost list and update the notification list with any changes that have to be written to the customer's storage.

108 Read validation failure list. Get the customers that were previously identified to notify for a change but were not notified because the web server was unable to write the information to the customer's storage.

109 Exit. Exit the process.

110 Update notification list. Update the notification list with the items from the validation failure list.

111 Attempt connection. Attempt to connect to each customer's web client workstation so that the unit cost changes can be written to the customer's storage.

112 Web client validates web server. The web client workstation validates the web server that is trying to write to the web client. That is, the web client makes sure the web server has the authority to write to the web client's storage.
113 Validate success? Was the validation successful on the part of the web server?
114 Update validation failure list. Update the customers that were unable to have the units costs updated in their storage.
115 Send E-mail to web client. Notify the web clients that the web server was denied access to the customer's web client workstation.
116 Update CCL. Update the customer cost list with the information that the customer was notified of the change to the cost of his services on the web server.
117 Update validation failure list. Remove from this list those customers who were previously not allowing the web server to access the web client's storage.
118 Update the customer's monitor list. Update with changed unit costs, and or new services and unit costs.

Figure 4:
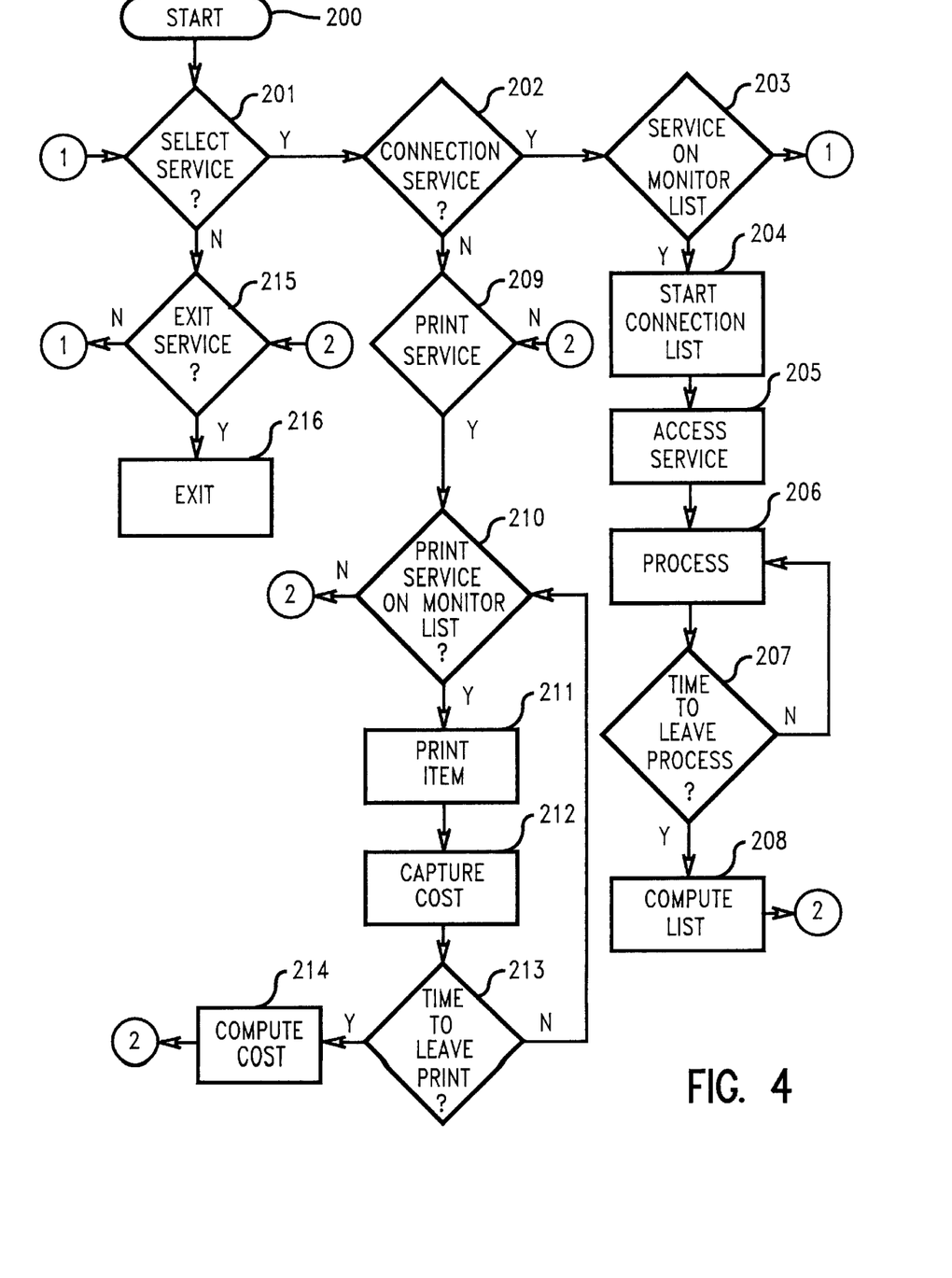

FIG. 4 describes the operations on the web client computer as it monitors costs of access and print services.
200 Start. Start the process to monitor the cost of services from the web client's system.
201 Select service. Select a workstation application.
202 Connection service? Is the application a connection service?
203 Service on monitor list? Is the service on the list of services to be monitored when the web client accesses the service!
204 Start connection timer. Start a timer application that will track the connection time that the web client is accessing the service.
205 Access the service. Access the computer that is providing the service and access the service.
206 Process. The web client is accessing and or using the service by running the service that is being provided.
207 Time to leave process. Does the web client want to disconnect and terminate the service?
208 Computer cost. The connection timer is stopped. The cost for the connection is computed by multiplying the time of connection by the cost for the service. The cost of the service is also summarized for that provider of the service on the summarized cost file.
209 Print service? Is the connection service a print service of proprietary material?
210 Print service on monitor list. Is the print service on the monitor list!
211 Print item. Print or view the propriety item.
212 Capture cost. Capture the cost of printing by writing the cost of printing the item to the print interim cost file.
213 Time to leave print. Do we wish to leave the print service?
214 Compute cost. Compute the cost of printing for each provider of service by adding the costs of the items printed or viewed for each provider. Summarize the costs for each provider on the summarized cost file.
215 Exit service? Do we want to disconnect from the selected service!
216 Exit. Exit the process.

Figure 5:
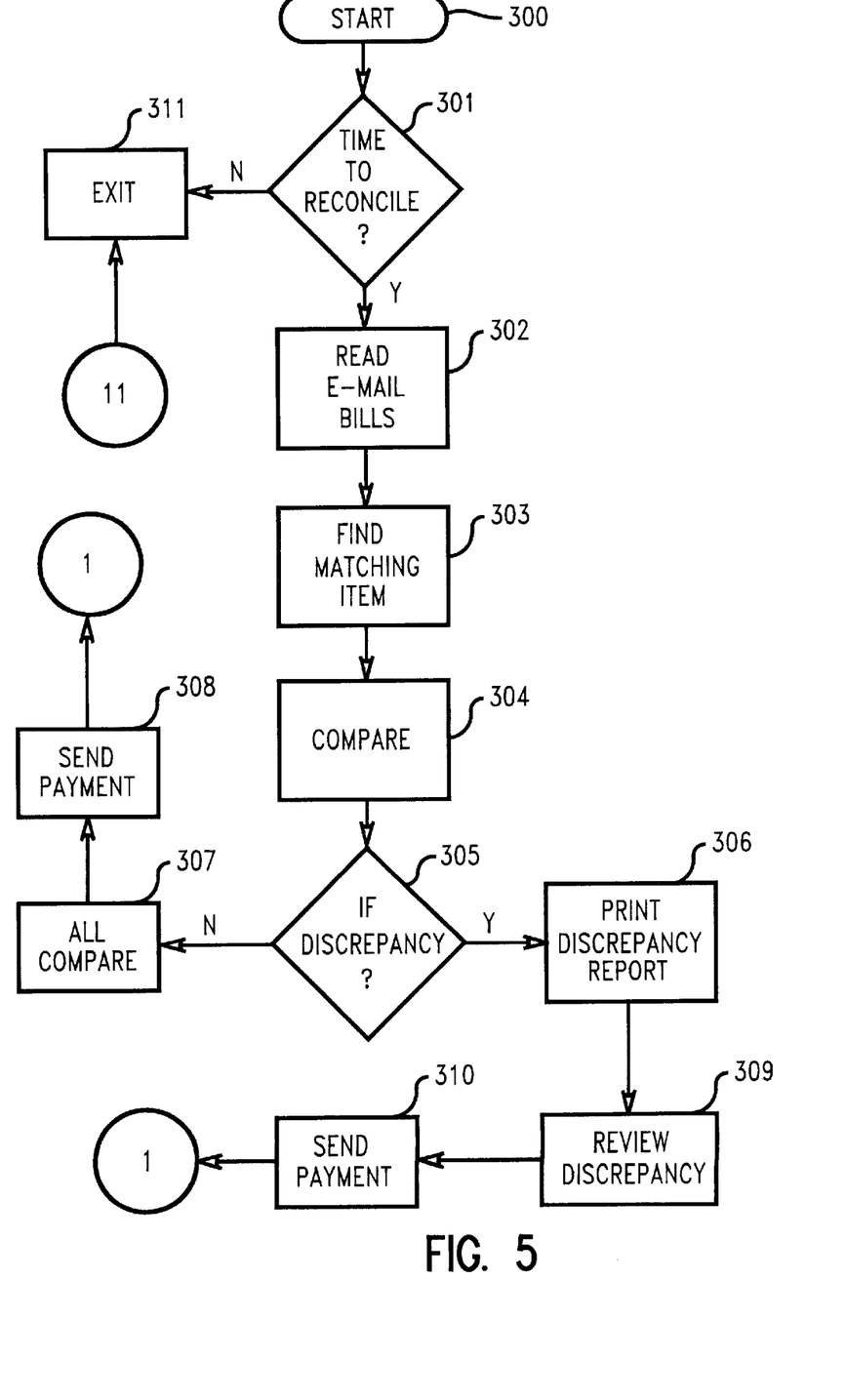

FIG. 5 describes the operations on the web client computer as it reconciles costs of access and print services determined by the web client and web network computers.
300 Start. Start the reconcile process.
301 Time to reconcile? Is it time to reconcile the costs from the providers of service?
302 Read E-mail bills. Read the costs of services from the providers.
303 Find matching item. Find the matching items on the summarized cost file and the E-mail bills from the providers of service.
304 Compare. Compare the matching items on the summarized cost file and the E-mail bills from the providers of service.
305 If discrepancy? Is there a discrepancy comparing the matching items on the summarized cost file and the E-mail bills from the providers of service?
306 Print discrepancy report. Print the discrepancy report of the matching items on the summarized cost file and the E-mail bills from the providers of service.
307 All compare. Print a notice that all the comparisons have been successfully reconciled.
311 Exit. Exit the process.
308 Send payment. Send payments to the providers of service.
309 Review discrepancy. Review all of the discrepancies and select those bills to pay as billed without a request for an explanation, those to pay as billed with a request for an explanation and those bills to pay as with the charges indicated by the web client tracking process with an explanation as to why the total charges have not been sent for payment.
320 Send payment to service provider.

Thus, the present invention provides a web client computer and software which can keep track of the time and costs of accessing computer services on the web or a network independent of the tracking done by the providers of services. The computer and computer program collect these charges from all of the providers and maintain a running total of the charges at the web client computer. Surcharges for web related services are periodically accumulated and can be printed, viewed and automatically stored in a file to show past and present billings. The computer program reconciles the charges from each provider of service, and then automatically send the electronic payment after reconciliation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for determining access charges to a web client computer for computer services from a web network computer comprising the steps of:
   a) providing a data base at said web client computer for unit time connection costs to a desired computer service accessible from a network;
   b) connecting said web client computer to the web network computer service;
   c) commencing timing at said web client computer of the connection to said computer service;
   d) disconnecting said web client computer from said computer service;
   e) determining at said web client computer the time connected to said computer service; and
   f) after disconnection, determining at said web client computer from said data base the total cost for the connection to said computer service independently of any cost determination by said computer service.

2. The process of claim 1 further including the step of determining if unit time connection costs for computer services have changed, and if said unit costs for computer services have changed, the step of updating said data base with the changed unit time connection costs for computer services.

3. The process of claim 2 wherein said web network computer determines if unit time connection costs for computer services have changed, and wherein said web network computer sends to said web client computer the changed unit time connection costs for computer services to update said data base.

4. The process of claim 3 including the steps of determining at said web client computer if said web network computer has authorization to update said data base, and if said web network computer has authorization, permitting said web network computer to access said data base to change the unit time connection costs for computer services.

5. The process of claim 3 including the step of maintaining at said web network computer a first list of web client computers which permit access to update the web client computer data base and a second list of web client computers which deny access to update the web client computer data base, and updating said list after sending to said web client computer the changed unit time connection costs for computer services.

6. The process of claim 3 including the steps of determining at said web client computer if said web network computer has authorization to update said data base, and if said web network computer does not have authorization, notifying said web network computer that it does not have access to update said data base.

7. The process of claim 6 including the step of sending notification from said web network computer to said web client computer that said web network computer was denied access to update the web client computer data base.

8. The process of claim 6 including the steps of maintaining at said web network computer a first list of web client computers which permit access to update the web client computer data base and a second list of web client computers which deny access to update the web client computer data base, and updating said list after sending to said web client computer the changed unit time connection costs for computer services.

9. The process of claim 1 further comprising the steps of:
  i) determining at said web network computer total web client computer connection cost for said desired computer service;
  ii) sending the total web client computer connection cost for said desired computer service from said web network computer to said web client computer; and
  iii) reconciling at said web client computer the total computer service connection cost determined by said web network computer with the total computer service connection cost determined by said web client computer.

10. The process of claim 9 including the step of authorizing payment at said web client computer of the total computer service connection cost determined by said web network computer.

11. The process of claim 9 wherein said step (i) reconciliation comprises determining at said web client computer any discrepancy in total service connection costs determined by said web network computer and said web client computer, and including the step of printing a report of any such discrepancy.

12. The process of claim 9 further including the step of maintaining at said web client computer a data base containing individual total computer service connection costs determined by said web client computer; and wherein said web network computer sends to the web client computer individual computer service total connection costs determined by said web network computer; and wherein said step (i) reconciliation comprises matching individual total service connection costs as determined by said web network computer and said web client computer to determine any discrepancy in total service connection costs, and including the step of printing a report of any such discrepancy.

13. The process of claim 11 including the steps of authorizing payment at said web client computer of the total computer service connection cost determined by said web network computer, and sending with said payment a request for explanation regarding any such discrepancy.

14. A system for determining access charges to a web client computer for computer services from a web network computer comprising:
  a data base at said web client computer of unit time connection costs to a desired computer service accessible from a network;
  means for connecting said web client computer to the web network computer service;
  means for determining at said web client computer the time connected to said computer service; and
  means for determining at said web client computer from said data base, after disconnection, the total cost for the connection to said computer service independently of any cost determination by said computer service.

15. The system of claim 1 further comprising:
  means for determining at said web network computer total web client computer connection cost for said desired computer service;
  means for sending the total web client computer connection cost for said desired computer service from said web network computer to said web client computer; and
  means for reconciling at said web client computer the total computer service connection cost determined by said web network computer with the total computer service connection cost determined by said web client computer.

16. A process for determining printing charges to a web client computer for computer services from a web network computer comprising the steps of:
  a) providing a data base at said web client computer for unit information printing costs from a desired computer service accessible from a network;
  b) connecting said web client computer to the web network computer service;
  c) commencing printing of information from said computer service;
  d) determining from the web client computer data base the printing cost for said information from said computer service;
  e) optionally commencing printing of further information from said computer service;
  f) determining from the web client computer data base the printing cost for any said further information from said computer service;
  g) after printing, determining at said web client computer from said data base the total cost for printing said information from said computer service independently of any cost determination by said computer service; and
  h) disconnecting said web client computer from said computer service.

17. The process of claim 16 further including the step of determining if unit information printing costs for computer services have changed, and if said unit costs for computer services have changed, the step of updating said data base with the changed unit information printing costs for computer services.

18. The process of claim 17 wherein said web network computer determines if unit information printing costs for computer services have changed, and wherein said web network computer sends to said web client computer the changed unit information printing costs for computer services to update said data base.

19. The process of claim 18 including the steps of determining at said web client computer if said web network computer has authorization to update said data base, and if said web network computer has authorization, permitting said web network computer to access said data base to change the unit information printing costs for computer services.

20. The process of claim 18 including the step of maintaining at said web network computer a first list of web client computers which permit access to update the web client computer data base and a second list of web client computers which deny access to update the web client computer data base, and updating said list after sending to said web client computer the changed unit information printing costs for computer services.

21. The process of claim 18 including the steps of determining at said web client computer if said web network computer has authorization to update said data base, and if said web network computer does not have authorization, notifying said web network computer that it does not have access to update said data base.

22. The process of claim 21 including the step of sending notification from said web network computer to said web client computer that said web network computer was denied access to update the web client computer data base.

23. The process of claim 21 including the steps of maintaining at said web network computer a first list of web client computers which permit access to update the web client computer data base and a second list of web client computers which deny access to update the web client computer data base, and updating said list after sending to said web client computer the changed unit information printing costs for computer services.

24. The process of claim 16 further comprising the steps of:
   i) determining at said web network computer total web client information printing cost for said desired computer service;
   ii) sending the total web client information printing cost for said desired computer service from said web network computer to said web client computer;
   iii) reconciling at said web client computer the total computer service information printing cost determined by said web network computer with the total computer service information printing cost determined by said web client computer.

25. The process of claim 24 including the step of authorizing payment at said web client computer of the total computer service information printing cost determined by said web network computer.

26. The process of claim 24 wherein said step (i) reconciliation comprises determining at said web client computer any discrepancy in total service information printing costs determined by said web network computer and said web client computer, and including the step of printing a report of any such discrepancy.

27. The process of claim 24 further including the step of maintaining at said web client computer a data base containing individual total computer service information printing costs determined by said web client computer; and wherein said web network computer sends to the web client computer individual computer service total information printing costs determined by said web network computer; and wherein said step (i) reconciliation comprises matching individual total service information printing costs as determined by said web network computer and said web client computer to determine any discrepancy in total service information printing costs, and including the step of printing a report of any such discrepancy.

28. The process of claim 26 including the steps of authorizing payment at said web client computer of the total computer service information printing cost determined by said web network computer, and sending with said payment a request for explanation regarding any such discrepancy.

29. A system for determining printing charges to a web client computer for computer services from a web network computer comprising:
   a data base at said web client computer of unit information printing costs from a desired computer service accessible from a network;
   means for determining from the web client computer data base the printing cost for information printed from said computer service; and
   means for determining at said web client computer, after printing, the total cost for printing information from said computer service independently of any cost determination by said computer service.

30. The system of claim 29 further comprising:
   means for determining at said web network computer total web client information printing cost for said desired computer service;
   means for sending the total web client information printing cost for said desired computer service from said web network computer to said web client computer; and
   means for reconciling at said web client computer the total computer service information printing cost determined by said web network computer with the total computer service information printing cost determined by said web client computer.

31. A program storage device readable by a machine, tangibly embodying a program of instructions executable by the machine to perform the process of claim 1.

32. A program storage device readable by a machine, tangibly embodying a program of instructions executable by the machine to perform the process of claim 16.

* * * * *